United States Patent
Chiba

(10) Patent No.: US 10,198,226 B2
(45) Date of Patent: Feb. 5, 2019

(54) IMAGE FORMING APPARATUS, CONTROL METHOD THEREFOR, AND COMPUTER-READABLE STORAGE MEDIUM IN WHICH A RESTRICTION MODE RESTRICTS IMAGE FORMATION BY A CARTRIDGE THAT IS A PREDETERMINED CARTRIDGE

(71) Applicant: CANON KABUSHIKI KAISHA, Tokyo (JP)

(72) Inventor: Shinichi Chiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/840,009

(22) Filed: Dec. 13, 2017

(65) Prior Publication Data
US 2018/0173476 A1   Jun. 21, 2018

(30) Foreign Application Priority Data
Dec. 21, 2016   (JP) .................................. 2016-248394

(51) Int. Cl.
*G06K 15/00* (2006.01)
*G06F 3/12* (2006.01)
*H04N 1/00* (2006.01)

(52) U.S. Cl.
CPC .......... *G06F 3/1239* (2013.01); *G06F 3/1222* (2013.01); *G06F 3/1238* (2013.01);
(Continued)

(58) Field of Classification Search
CPC .... G06F 3/1239; G06F 3/1222; G06F 3/1238; G06F 3/1286; H04N 1/0084; H04N 1/00875; H04N 2201/0094
See application file for complete search history.

(56) References Cited

U.S. PATENT DOCUMENTS 8,965,233 B2    2/2015   Katahira
2006/0268331 A1*  11/2006   Fukunishi ............. G06F 21/608
358/1.15
(Continued)

FOREIGN PATENT DOCUMENTS

GB    2 354 735 A    4/2001
JP    2008152419 A    7/2008
(Continued)

OTHER PUBLICATIONS

Combined Search and Examination Report Under Sections 17 and 18(3), dated Jun. 20, 2018, issued in British Patent Application No. 1721423.0.

*Primary Examiner* — Moustapha Diaby
(74) *Attorney, Agent, or Firm* — Venable LLP

(57) ABSTRACT

An image forming apparatus determines, if a restriction mode is set in which image formation by a predetermined cartridge is restricted, whether a cartridge loaded to the apparatus is the predetermined cartridge. If the cartridge loaded to the apparatus is the predetermined cartridge, the apparatus determines whether an accepted job is a specific job of printing information for purchasing a cartridge for which image formation is not restricted. If the accepted job is the specific job, the apparatus executes printing based on the accepted job without restricting the image formation by the predetermined cartridge, and executes printing based on an accepted job if the restriction mode is not set or if the cartridge loaded to the apparatus is not the predetermined cartridge. If the accepted job is not the specific job, the apparatus restricts execution of the image formation by the predetermined cartridge loaded to the image forming apparatus.

11 Claims, 5 Drawing Sheets

(52) U.S. Cl.
CPC ......... *G06F 3/1286* (2013.01); *H04N 1/0084* (2013.01); *H04N 1/00875* (2013.01); *H04N 2201/0094* (2013.01)

(56) References Cited

U.S. PATENT DOCUMENTS

| | | | |
|---|---|---|---|
| 2009/0103933 A1* | 4/2009 | Miyazaki | G03G 21/1892 399/12 |
| 2009/0116854 A1* | 5/2009 | Kitazawa | G03G 15/55 399/12 |
| 2012/0147396 A1* | 6/2012 | Kobayashi | G03G 21/04 358/1.9 |
| 2013/0216253 A1 | 8/2013 | Katahira | |

FOREIGN PATENT DOCUMENTS

| | | |
|---|---|---|
| JP | 2013171133 A | 9/2013 |
| WO | 2008/024884 A2 | 2/2008 |

* cited by examiner

FIG. 3
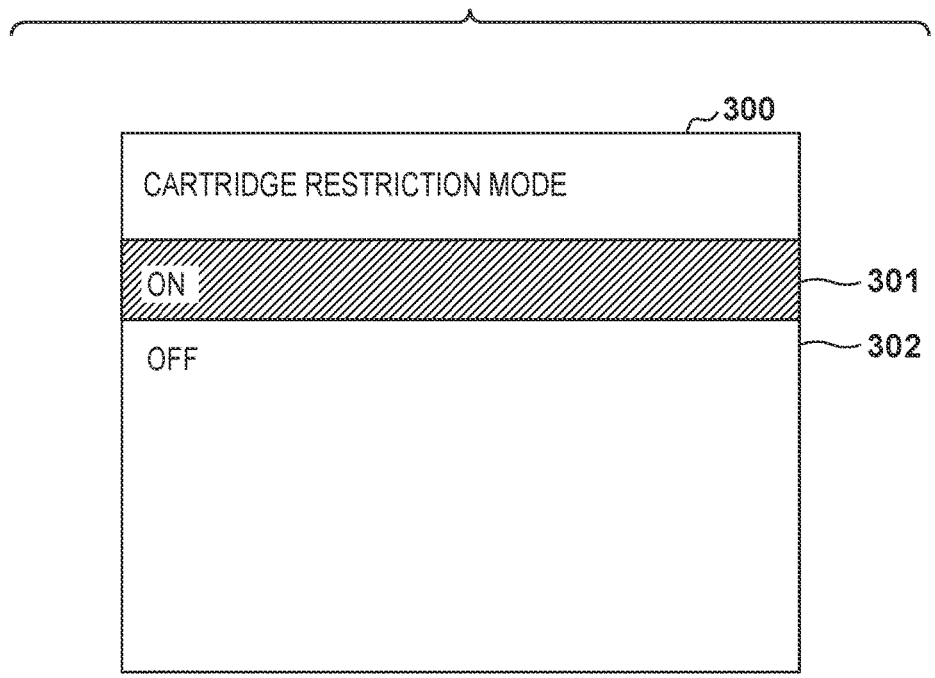
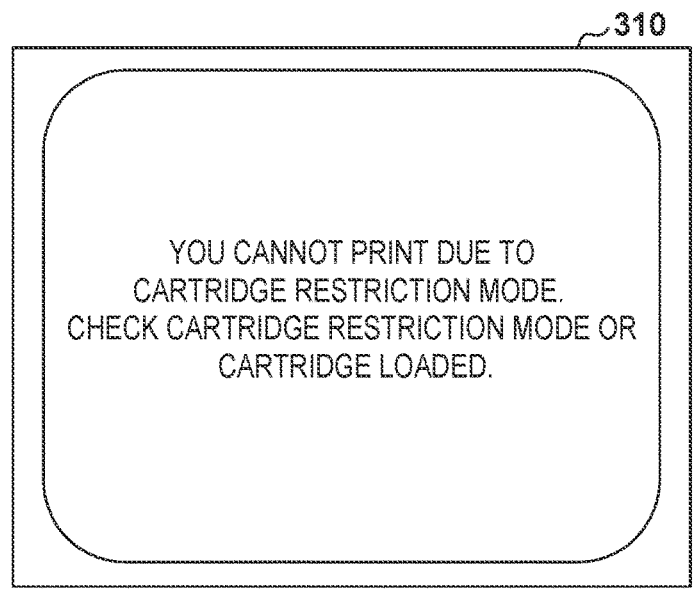

IMAGE FORMING APPARATUS, CONTROL METHOD THEREFOR, AND COMPUTER-READABLE STORAGE MEDIUM IN WHICH A RESTRICTION MODE RESTRICTS IMAGE FORMATION BY A CARTRIDGE THAT IS A PREDETERMINED CARTRIDGE

This application claims the benefit of Japanese Patent Application No. 2016-248394, filed on Dec. 21, 2016, which is hereby incorporated by reference herein in its entirety.

BACKGROUND OF THE INVENTION

Field of the Invention

The present invention relates to an image forming apparatus that executes printing on a sheet in accordance with image data, a control method therefor, and a computer-readable storage medium.

Description of the Related Art

A multifunction peripheral or a printer includes a portion that is consumed, during an operation, like a toner cartridge or another component. Therefore, an operation of replacing the consumable portion reaching a predetermined consumption degree with a new consumable portion is set. A plurality of types of toner cartridges (i.e., consumable portions) applicable to the same model multifunction peripheral may exist for the purpose of, for example, implementing various color expressions. As a consequence, a user may purchase an unintended cartridge mistakenly. For example, the user who purchases the unintended cartridge obtains a printing result that is not according to his or her intention, burdening the user with a print failure cost.

In order to prevent the above-described failure, Japanese Patent Laid-Open No. 2008-152419 proposes a technique of permitting printing only if a cartridge is determined to be a specific type, and prohibiting printing in other cases. With this technique, the user does not need to execute printing with the unintended cartridge, and can further become aware that the cartridge he or she purchases is not according to his or her intention. Japanese Patent Laid-Open No. 2013-171133 proposes a multifunction peripheral that prints out (to be referred to as consumable print hereinafter) information (a product name, the contact of a supplier, and the like) needed for a user to purchase a consumable portion, such as a toner cartridge.

The above-described conventional technique, however, has a problem described below. For example, in the above-described conventional technique, if all printing is prohibited when a toner cartridge other than a predetermined cartridge is set, consumable print, as described above, cannot be executed either. This restricts the user in obtaining information on a cartridge supposed to be purchased.

SUMMARY OF THE INVENTION

The present invention provides a mechanism for permitting predetermined image formation even in a state in which image formation is restricted.

One aspect of the present invention provides an image forming apparatus with a detachable cartridge for image formation, the apparatus comprising an accepting unit that accepts a job, a determination unit that determines, if a restriction mode is set in which execution of image formation by a predetermined cartridge is restricted, whether or not the accepted job is a specific job, and a control unit that permits execution of restricted image formation if the determination unit determines that the accepted job is the specific job.

Another aspect of the present invention provides a control method for an image forming apparatus with a detachable cartridge for image formation, the method comprising accepting a job, determining, if a restriction mode is set in which execution of image formation by a predetermined cartridge is restricted, determining, whether the accepted job is a specific job, and controlling the image forming apparatus to permit execution of restricted image formation if it is determined that the accepted job is the specific job.

Still another aspect of the present invention provides a non-transitory computer-readable storage medium storing a computer program for causing a computer to execute each step of a control method for an image forming apparatus with a detachable cartridge regarding image formation, the method comprising accepting a job, determining, if a restriction mode is set in which execution of image formation by a predetermined cartridge is restricted, determining whether the accepted job is a specific job, and controlling the image forming apparatus to permit execution of restricted image formation if it is determined in the determining that the accepted job is the specific job.

Further features of the present invention will be apparent from the following description of exemplary embodiments with reference to the attached drawings.

BRIEF DESCRIPTION OF THE DRAWINGS

FIG. 3 is a view illustrating screens regarding the cartridge restriction mode.

DESCRIPTION OF THE EMBODIMENTS

Preferred embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

First Embodiment

Schematic Arrangement of Image Forming Apparatus

Figure 1:
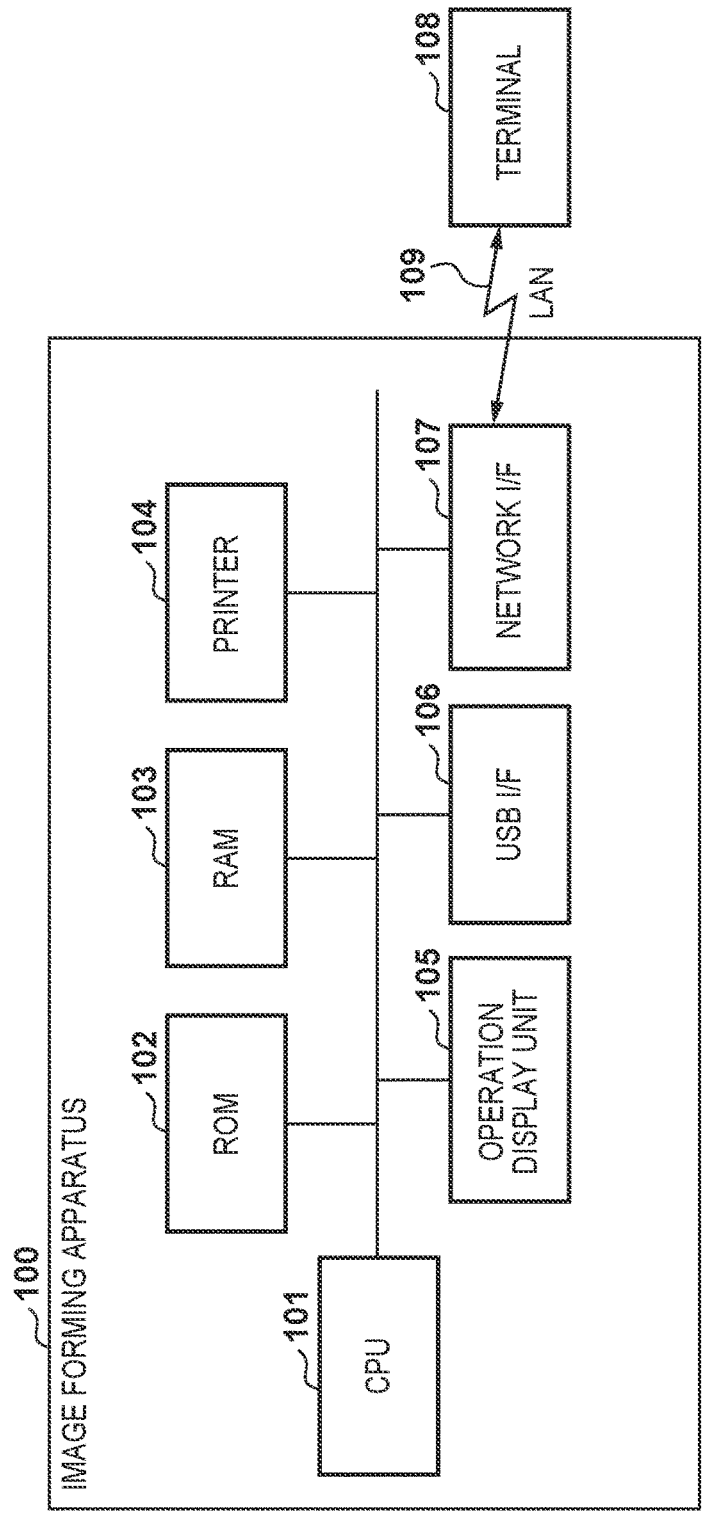
FIG. 1 is a block diagram showing an image forming apparatus.

The first embodiment of the present invention will be described below. First, an example of the arrangement of an image forming apparatus 100 according to this embodiment will be described with reference to FIG. 1. A printing apparatus serving as the image forming apparatus 100 will be described here as an example. The present invention is not limited to this example, however, and an image forming apparatus 100 with a mounted consumable is also applicable.

The image forming apparatus 100 includes a CPU 101, a ROM 102, a RAM 103, a printer 104, and an operation display unit 105. The image forming apparatus 100 also includes a USB (Universal Serial Bus) I/F 106 and a network I/F 107 as communication interfaces with external devices. A cartridge, for example, a toner cartridge for image formation, is detachable from the printer 104. The toner cartridge is a consumable portion, and is replaced by a user when replacement is needed. An unintended cartridge may, however, be loaded mistakenly.

The CPU 101 is a system control unit and generally controls the entire image forming apparatus 100. The ROM 102 stores control programs of the CPU 101. Note that the above-described control programs are control programs that execute an example to be described below. The ROM 102 includes a type of memory, such as a rewritable flash ROM, and stores setting values, management data, and the like, registered by the user of the image forming apparatus 100. The RAM 103 stores execution programs, program control variables, various work buffers, and the like, and some setting values, management data, and the like, registered by the user of the image forming apparatus 100.

The printer 104 prints a received image or file data on printing paper. The operation display unit 105 is formed by a keyboard or touch panel serving as an operation unit, and an LCD, an LED, or the like, serving as a display unit. The operation display unit 105 accepts various operations by the user, displays an operation screen, or notifies the user.

The USB I/F 106 performs connection, communication, power supply, and the like, with a USB device (not shown). The network I/F 107 transmits and receives data to and from the respective units of the image forming apparatus 100 via a LAN 109. In particular, the network I/F 107 receives a print job from a terminal 108, such as an external terminal, or receives control information of the image forming apparatus 100. Note that the LAN 109 includes a LAN (wired LAN) that performs wired communication and a LAN (wireless LAN) that performs wireless communication.

Processing Procedure

Figure 2:
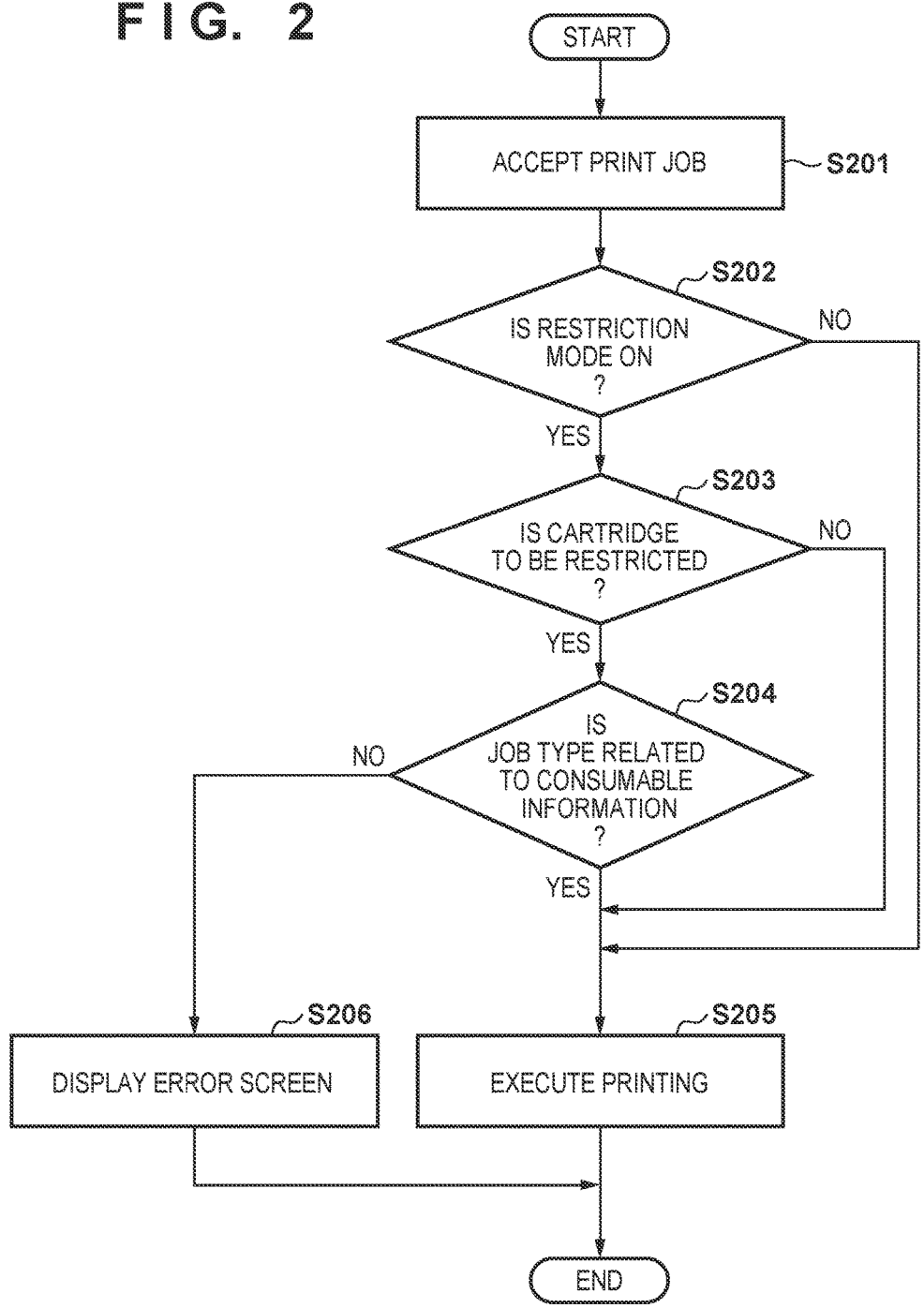
FIG. 2 is a flowchart illustrating a control method for a print job related to consumable information in a cartridge restriction mode.

A processing procedure of controlling a print job related to consumable information in a cartridge restriction mode according to this embodiment will now be described with reference to FIG. 2. Processing to be described below is implemented, for example, when the CPU 101 executes programs read out from the ROM 102 or the like. Note that a description will be given here by using only the print job (specific print job) related to the consumable information as a print job to be permitted. Note that the present invention can set various print jobs as print jobs to be permitted. A detail will be described later.

The cartridge restriction mode is a mode to restrict execution of print processing by the image forming apparatus 100 when a cartridge other than a predetermined type of cartridge is loaded to the image forming apparatus 100. It is possible, by enabling the cartridge restriction mode, to prevent the user from loading the cartridge other than the predetermined type of cartridge to the image forming apparatus 100 mistakenly and executing the print processing. For example, a case will be described in which a print system administrator decides an operation policy of operating a system by using the predetermined type of cartridge from the viewpoint of the quality of a printed product or the like. In such a case, a system user may load the cartridge other than the predetermined type of cartridge mistakenly or without noticing the operation policy of the administrator and execute the print processing. To prevent this, the cartridge restriction mode is enabled to restrict execution of the print processing if the cartridge other than the predetermined type of cartridge is loaded, even without awareness by the user other than the administrator, allowing the user to execute print processing complying with the operation policy. In this embodiment, the user, such as the administrator, can switch whether to enable the function of the cartridge restriction mode by a setting.

The consumable information is information used by the user to purchase a consumable portion, such as a cartridge. The consumable information is information indicating, for example, the product name of a consumable portion, the contact or address of a supplier, and the like. The image forming apparatus 100 desirably holds the consumable information in advance. Note that if the image forming apparatus 100 is connected to a server, or the like, via a network, the image forming apparatus 100 may obtain the consumable information from the server, or the like.

First, in step S201, the CPU 101 of the image forming apparatus 100 functions as an accepting unit and accepts a print job instructed via the externally connected terminal 108 or the operation display unit 105 of the image forming apparatus 100. Subsequently, in step S202, the CPU 101 determines the setting state of the cartridge restriction mode set in advance by the user. If the restriction mode is ON (enabled) (the branch to "Yes" in step S202), the process advances to step S203. Otherwise, the process advances to step S205.

In step S203, the CPU 101 determines whether the cartridge loaded to the image forming apparatus 100 currently is a cartridge to be restricted. The determination processing may be performed, for example, based on information related to the loaded cartridge, such as product information obtained from a control chip provided for the cartridge by communicating with the control chip. In this case, for example, the CPU 101 may determine that the cartridge is not to be restricted if predetermined information is obtained, and may determine that the cartridge is to be restricted if the predetermined information is not obtained. Alternatively, a reverse determination may be made. If the cartridge is to be restricted (the branch to "Yes" in step S203), the process advances to step S204. Otherwise, the process advances to step S205.

In step S204, the CPU 101 determines whether the job type of the accepted print job is printing related to the consumable information. A job of the job type related to the consumable information is, for example, a job of causing the image forming apparatus 100 to print the above-described consumable information. For example, when the user operates the operation display unit 105 to input an instruction to print the consumable information to the image forming apparatus 100, a job related to the consumable information is issued. If the job type of the accepted print job is the print job related to the consumable information (the branch to "Yes" in step S204), the process advances to step S205. Otherwise, the process advances to step S206.

In step S205, the CPU 101 executes printing in accordance with the print job and terminates the process. On the other hand, if the job type of the accepted print job is not the print job related to the consumable information (the branch to "No" in step S204), in step S206, the CPU 101 displays a screen indicating a print error and terminates the process without executing printing. Note that if the cartridge restriction mode is OFF (the branch to "No" in step S202), or if the cartridge is not to be restricted (the branch to "No" in step S203), in step S205, the CPU 101 executes printing and terminates the process.

Screen Example

An example of screens displayed on the operation display unit 105 of the image forming apparatus 100 according to this embodiment will now be described with reference to FIG. 3. Note that a description will be given here by taking the screens displayed on the operation display unit 105 as the example. The present invention is not limited to this example, however, and the screens may be displayed on a display unit of the terminal 108 connected via the network. That is, the cartridge restriction mode may be set based on an instruction from the terminal 108 serving as the external terminal.

A setting screen 300 is a screen for setting the cartridge restriction mode. The setting screen 300 is displayed on the operation display unit 105 in accordance with a predetermined operation via the operation display unit 105 by the user. An option 301 of enabling the cartridge restriction mode and an option 302 for disabling the cartridge restriction mode are selectively displayed on the setting screen 300. The option 301 and the option 302 are selected in accordance with a user input via the operation display unit 105. FIG. 3 shows a state in which the option 301 is selected.

A display screen 310 is a display screen indicating that printing is impossible when the cartridge restriction mode is enabled in the present invention and an error screen is displayed on the operation display unit 105 in step S206 described above. A message for indicating that the print job cannot be executed due to the cartridge restriction mode and promoting the user to check the cartridge loaded is displayed on the display screen 310.

As described above, if the cartridge restriction mode is set in which execution of image formation by the cartridge is restricted when the print job is accepted, the image forming apparatus 100 according to this embodiment determines whether the accepted job is a specific job. Furthermore, this image forming apparatus 100 permits execution of the restricted image formation if the image forming apparatus 100 determines that the accepted job is the specific job. For example, according to this embodiment, the image forming apparatus 100 permits execution of the print job regarding the consumable information, and restricts execution of another print job even if the cartridge restriction mode is enabled. That is, it is possible to provide a mechanism for permitting execution of printing of information needed by the user even if an unintended cartridge is loaded. This allows the user to easily obtain, for example, purchase information of a predetermined cartridge that is not restricted by the cartridge restriction mode.

Note that the present invention is not limited to the above-described embodiment, and various modifications are possible. For example, a mode has been described in this embodiment in which control is performed so as to permit execution of printing if the job type is the job related to the consumable information even in the cartridge restriction mode. The present invention is not limited, however, to this example. That is, in the present invention, control may be performed so as to permit execution of printing even in the cartridge restriction mode when another job type is accepted. That is, the image forming apparatus 100 according to the present invention has an arrangement for suitably permitting predetermined image formation even in a state in which the unintended cartridge is loaded, and image formation is restricted.

The example has been described in this embodiment in which image formation is partially permitted in accordance with the job type. The present invention is not limited, however, to this example. For example, control may be performed so as to permit execution of printing even in the cartridge restriction mode if a user who instructs the print job is identified as a predetermined user. The predetermined user may be determined by a user ID or the like, and may be, for example, a system administrator or a person in charge of maintenance. Alternatively, if the print job is accepted from an external apparatus, the predetermined user may be determined based on the terminal ID of a transmission source of the external apparatus.

Furthermore, based on information added to the print job, control may be performed as to whether to permit execution of printing even in the cartridge restriction mode. For example, if the added information contains permission information that permits execution of the print job even in the cartridge restriction mode, execution of printing may be permitted. In this case, the image forming apparatus 100 holds predetermined permission information and performs control so as to permit execution of printing if the information added to the print job matches the held permission information.

As described above, the image forming apparatus 100 according to the present invention can permit image formation for the specific job even in the cartridge restriction mode. Note that various jobs, as described above, can be treated as specific jobs. A condition may be set, however, for which a job is to be treated as the specific job. For example, a setting screen for setting that at least one of a print job that includes a predetermined job type, a print instruction from the predetermined user or a predetermined apparatus, and the predetermined permission information, and a print job for outputting a printed product on which predetermined contents are printed is treated as a specific job, may be displayed on the operation display unit 105. In this case, the image forming apparatus 100 may determine whether to permit image formation based on a setting (condition) selected in accordance with a user input via the setting screen.

Second Embodiment

The second embodiment of the present invention will be described below. In addition to the arrangement of the first embodiment described above, an image forming apparatus 100 according to this embodiment has an arrangement for inquiring of a user whether to permit execution of printing even if the job type of an accepted print job is not a predetermined job type.

Processing Procedure

Figure 4:
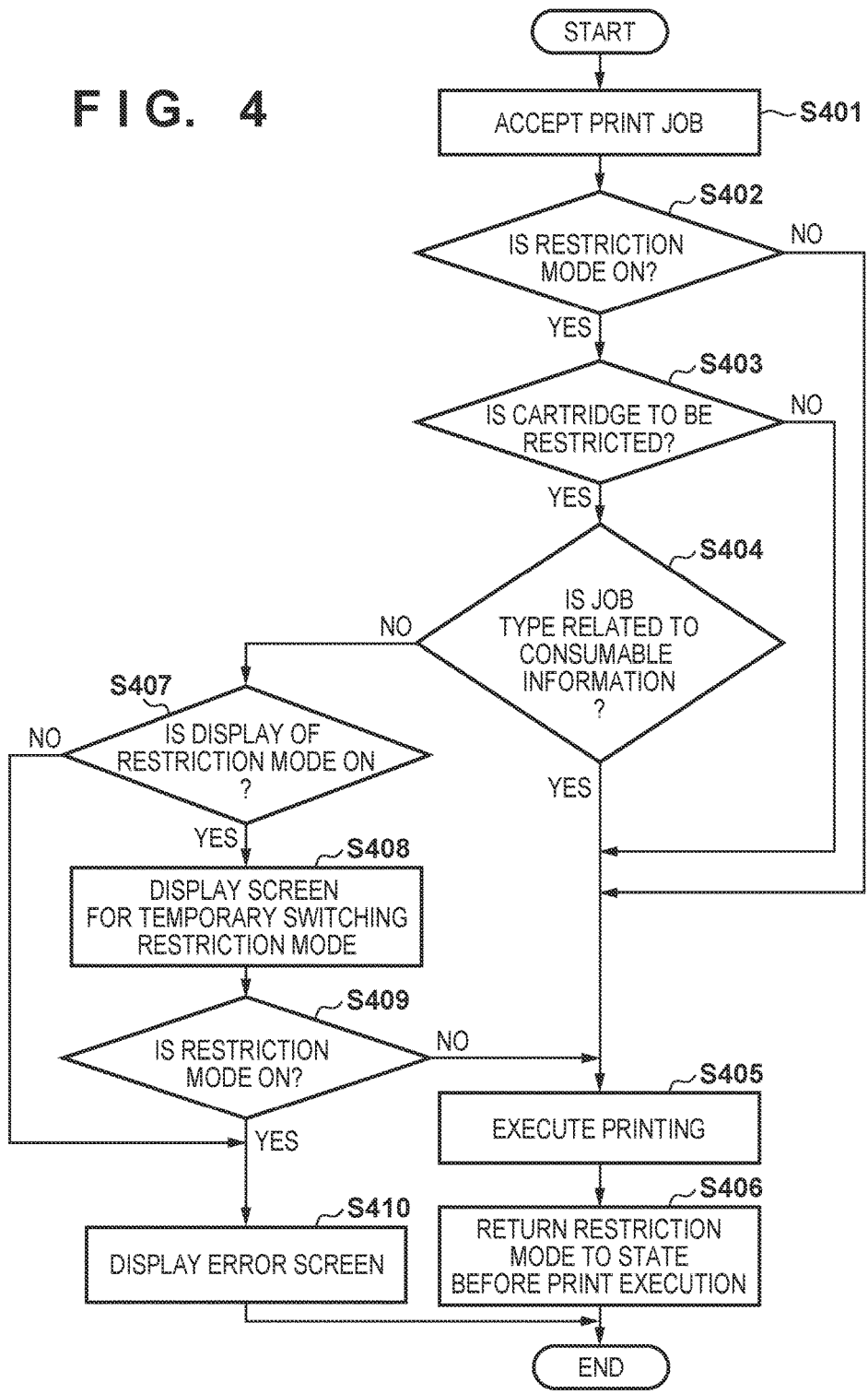
FIG. 4 is a flowchart illustrating a control method for a print job related to consumable information in a cartridge restriction mode.

First, a processing procedure of controlling a print job related to consumable information in a cartridge restriction mode according to this embodiment will be described with reference to FIG. 4. Processing to be described below is implemented, for example, when a CPU 101 executes programs read out from a ROM 102 or the like. Note that a description will be given here by using only the print job related to the consumable information as a print job to be permitted. The modification described at the end of the above-described first embodiment, however, is applicable.

First, in step S401, the CPU 101 of an image forming apparatus 100 accepts a print job instructed via an externally connected terminal 108 or an operation display unit 105 of the image forming apparatus 100. Subsequently, in step S402, the CPU 101 determines the setting state of the cartridge restriction mode set in advance by a user. If the restriction mode is ON (enabled) (the branch to "Yes" in step S402), the process advances to step S403. Otherwise, the process advances to step S405.

In step S403, the CPU 101 determines whether a cartridge loaded to the image forming apparatus 100 currently is a cartridge to be restricted. The determination processing is the same as in step S203 of the first embodiment, described above, and thus, a detailed description thereof will be omitted. If the cartridge is to be restricted (the branch to "Yes" in step S403), the process advances to step S404. Otherwise, the process advances to step S405.

In step S404, the CPU 101 determines whether the job type of the accepted print job is the print job related to the consumable information. The determination processing is the same as in step S204 of the first embodiment, described above, and thus, a detailed description thereof will be omitted. If the job type of the accepted print job is the print job related to the consumable information (the branch to "Yes" in step S404), the process advances to step S405. Otherwise, the process advances to step S407.

In step S405, the CPU 101 executes printing, and the process advances to step S406. On the other hand, if the job type of the accepted print job is not the print job related to the consumable information (the branch to "No" in step S404), in step S407, the CPU 101 determines whether a setting to display a setting screen (selection screen) 510 in the cartridge restriction mode to be described later is ON. If the setting to display the setting screen 510 in the cartridge restriction mode is ON (the branch to "Yes" in step S407), the process advances to step S408. Otherwise, the process advances to step S410.

In step S408, the CPU 101 displays the setting screen 510 that makes the user select whether to temporarily change the cartridge restriction mode on the operation display unit 105. Subsequently, in step S409, the CPU 101 determines whether the cartridge restriction mode is ON again. That is, the CPU 101 determines whether the cartridge restriction mode is temporarily disabled (OFF) via the setting screen 510. If the cartridge restriction mode is OFF (the branch to "No" in step S409), the process advances to step S405 in which the CPU 101 executes printing, and the process advances to step S406. Note that if the cartridge restriction mode is OFF (the branch to "No" in step S402), or if the cartridge is not to be restricted (the branch to "No" in step S403), the CPU 101 also executes printing, and the process advances to step S406.

On the other hand, if the setting to display the setting screen 510 in the cartridge restriction mode is OFF (the branch to "No" in step S407), or if the setting of the cartridge restriction mode after resetting is ON (the branch to "Yes" in step S409), the process advances to step S410. In step S410, the CPU 101 displays a screen indicating a print error and terminates the process without executing printing.

Note that if the CPU 101 executes printing, the process advances to step S406 in which the CPU 101 returns the cartridge restriction mode to an enabled state if the mode is disabled temporarily, and terminates the process. That is, after image formation terminates, a process of transiting to the cartridge restriction mode of a state before execution of image formation is executed here.

Screen Example

Figure 5:
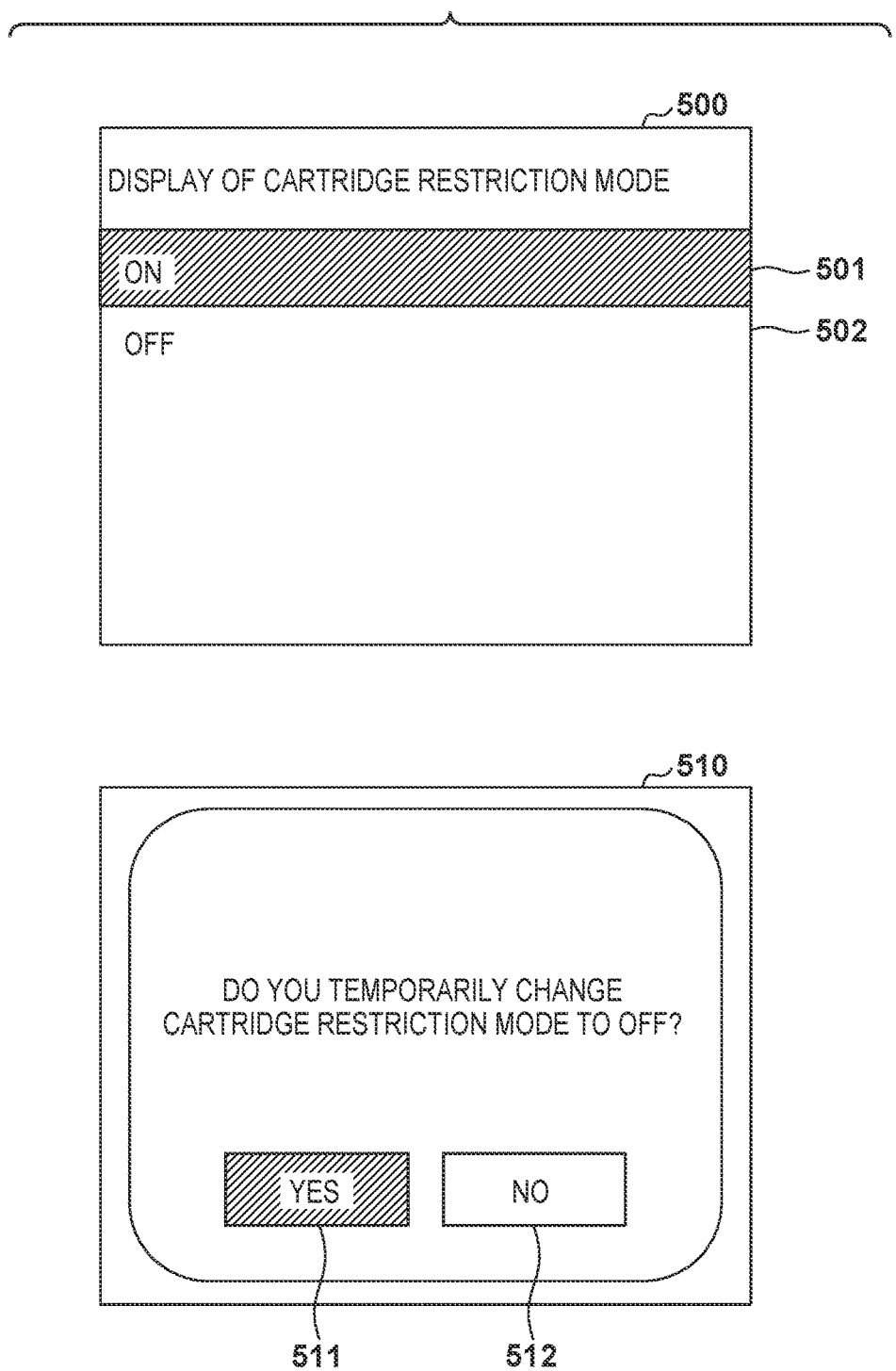
FIG. 5 is a view illustrating screens regarding the cartridge restriction mode.

An example of screens displayed on the operation display unit 105 of the image forming apparatus 100 according to this embodiment will now be described with reference to FIG. 5. A setting screen 500 is a screen for setting display or non-display of the setting screen (selection screen) 510 in the cartridge restriction mode of the present invention. The setting screen 500 is displayed on the operation display unit 105 by operating the setting screen by the user. An option 501 of displaying the setting screen 510 capable of selecting whether to temporarily change the cartridge restriction mode to be disabled if a job other than the specific job is accepted when the mode is enabled, and an option 502 of not displaying the setting screen 510 are selectively displayed on the setting screen 500. The option 501 and the option 502 are selected in accordance with a user input via the operation display unit 105.

As described above, the setting screen 510 is a screen for temporarily setting the cartridge restriction mode in the present invention to OFF in accepting the print job when the mode is ON. The setting screen is a screen displayed on the operation display unit 105 in step S408 of the flowchart in FIG. 4. That is, the setting screen 510 is displayed on the operation display unit 105 when the cartridge restriction mode is ON, and display of the screen capable of changing the cartridge restriction mode is ON. An option 511 of temporarily disabling the cartridge restriction mode, and an option 512 of not temporarily disabling the cartridge restriction mode, that is, maintaining the mode in the enabled state, are selectively displayed on the setting screen 510. That is, printing of the accepted print job is executed when the option 511 is selected, and printing of the accepted print job is not executed, and an error screen is displayed when the option 512 is selected.

As described above, in the image forming apparatus according to this embodiment, if a print job other than a specific job of permitting printing is accepted when the cartridge restriction mode is enabled, inquiry of whether to execute printing is made to the user. This makes it possible to implement image formation control according to a user intention, and to provide a mechanism in more consideration of user convenience.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus with a detachable cartridge for image formation, the apparatus comprising:
   (A) a printer;
   (B) a memory that stores instructions; and
   (C) a processor that executes the instructions to cause the image forming apparatus:
      (a) to accept a job;
      (b) to determine, if a restriction mode is set in which execution of the image formation by a predetermined cartridge is restricted, whether a cartridge loaded to the image forming apparatus is the predetermined cartridge by trying to obtain information related to the cartridge loaded to the image forming apparatus;
      (c) to determine, if the cartridge loaded to the image forming apparatus is the predetermined cartridge, whether the accepted job is a specific job, the specific job being a job of printing information for purchasing a cartridge for which execution of the image formation is not restricted;
      (d) to execute, if the accepted job is the specific job, printing by the printer based on the accepted job without restricting the execution of the image formation by the predetermined cartridge loaded to the image forming apparatus; and
      (e) to execute the printing by the printer based on an accepted job if the restriction mode is not set or if the cartridge loaded to the image forming apparatus is not the predetermined cartridge,
      wherein, if the accepted job is not the specific job, the execution of the image formation by the predetermined cartridge loaded to the image forming apparatus based on the accepted job is restricted.

2. The apparatus according to claim 1, further comprising a display unit, wherein the processor further executes the instructions to cause the image forming apparatus to display, on the display unit, a message indicating that image formation is restricted if the accepted job is not the specific job.

3. The apparatus according to claim 1, further comprising a display unit, wherein the processor further executes the instructions to cause the image forming apparatus to display, on the display unit, a selection screen for selecting whether to permit image formation temporarily if the accepted job is not the specific job.

4. The apparatus according to claim 1, wherein the processor further executes the instructions to cause the image forming apparatus to function as an operation unit that accepts the job.

5. The apparatus according to claim 1, wherein the processor executes the instructions to cause the image forming apparatus to determine that a cartridge loaded to the image forming apparatus is the predetermined cartridge if information related to the cartridge from a control chip provided in the cartridge loaded to the image forming apparatus is obtained by the image forming apparatus communicating with the control chip.

6. A control method for controlling an image forming apparatus with a detachable cartridge for image formation, the method comprising:
   accepting a job;
   determining, if a restriction mode is set in which execution of the image formation by a predetermined cartridge is restricted, whether a cartridge loaded to the image forming apparatus is the predetermined cartridge by trying to obtain information related to the cartridge loaded to the image forming apparatus;
   determining, if the cartridge loaded to the image forming apparatus is the predetermined cartridge, whether the accepted job is a specific job, the specific job being a job of printing information for purchasing a cartridge for which execution of the image formation is not restricted;
   executing, if the accepted job is the specific job, printing by a printer of the image forming apparatus based on the accepted job without restricting the execution of the image formation by the predetermined cartridge loaded to the image forming apparatus; and
   executing the printing by the printer based on an accepted job if the restriction mode is not set or if the cartridge loaded to the image forming apparatus is not the predetermined cartridge,
   wherein, if the accepted job is not the specific job, the execution of the image formation by the predetermined cartridge loaded to the image forming apparatus based on the accepted job is restricted.

7. The method according to claim 6, further comprising displaying, on a display unit, a message indicating that image formation is restricted if the accepted job is not the specific job.

8. The method according to claim 6, further comprising displaying, on a display unit, a selection screen for selecting whether to permit image formation temporarily if the accepted job is not the specific job.

9. The method according to claim 6, further comprising accepting the job via operation means of the image forming apparatus.

10. The method according to claim 6, further comprising determining that a cartridge loaded to the image forming apparatus is the predetermined cartridge if information related to the cartridge from a control chip provided in the cartridge loaded to the image forming apparatus is obtained by the image forming apparatus communicating with the control chip.

11. A non-transitory computer-readable storage medium storing a computer program for causing a computer to execute each step of a control method for controlling an image forming apparatus with a detachable cartridge regarding image formation, the method comprising:
   accepting a job;
   determining, if a restriction mode is set in which execution of the image formation by a predetermined cartridge is restricted, whether a cartridge loaded to the image forming apparatus is the predetermined cartridge by trying to obtain information related to the cartridge loaded to the image forming apparatus;
   determining, if the cartridge loaded to the image forming apparatus is the predetermined cartridge, whether the accepted job is a specific job, the specific job being a job of printing information for purchasing a cartridge for which execution of the image formation is not restricted;
   executing, if the accepted job is the specific job, printing by a printer of the image forming apparatus based on the accepted job without restricting the execution of the image formation by the predetermined cartridge loaded to the image forming apparatus; and executing the printing by the printer based on an accepted job if the restriction mode is not set or if the cartridge loaded to the image forming apparatus is not the predetermined cartridge, wherein, if the accepted job is not the specific job, the execution of the image formation by the predetermined cartridge loaded to the image forming apparatus based on the accepted job is restricted.

* * * * *